Feb. 14, 1961
W. H. M. GREEN
2,971,755
DOOR ACTUATOR AND LOCKING SYSTEM
Filed Aug. 18, 1959
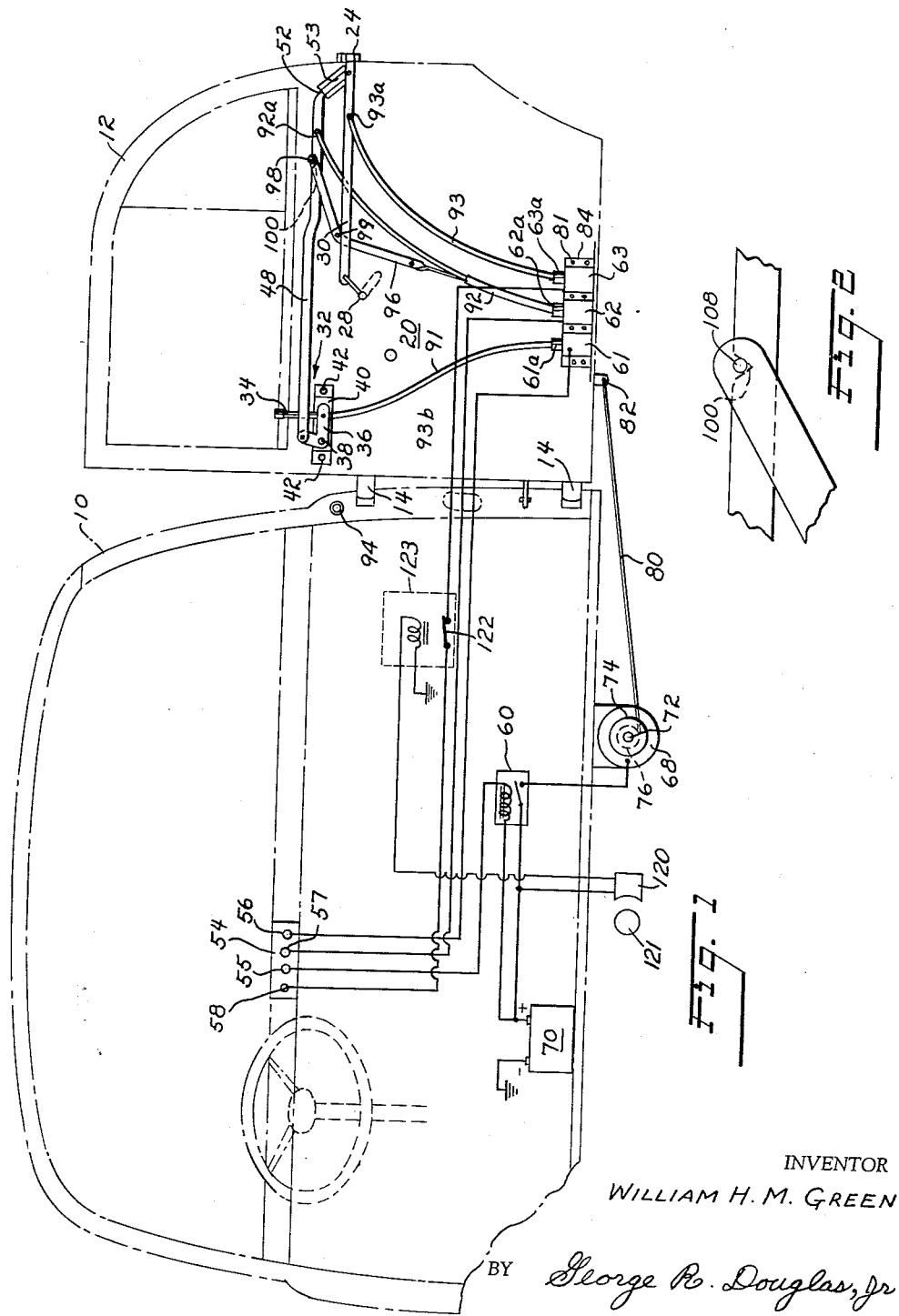
INVENTOR
WILLIAM H. M. GREEN
BY George R. Douglas, Jr.
ATTORNEY

United States Patent Office 2,971,755
Patented Feb. 14, 1961

2,971,755

DOOR ACTUATOR AND LOCKING SYSTEM

William H. M. Green, Washington, D.C., assignor to Systems Control, Inc., Hyattsville, Md., a corporation of Maryland Filed Aug. 18, 1959, Ser. No. 834,565

7 Claims. (Cl. 268—65)

The present invention relates to a door actuator and locking system, and has more particular reference to an improved system using the usual lever mechanisms found in automobile doors together with ancillary devices including push button operated solenoids and connecting flexible cabling to actuate conventional lever mechanisms of the door. Also, the invention more particularly includes a motor actuated by a push button means and a cable connected to a rubber spool mounted on a shaft of the motor for actuating the door into a closed position.

The invention seeks to provide a novel arrangement of elements available in kit form for installation within a door or doors of an automobile, and in connection with associated parts of the automobile to achieve an effective and efficient actuation and locking system for the door or doors of the automobile.

Basically, the present invention provides a novel and improved door actuator and locking system that is simple to install on any conventional vehicle and is as readily easy to maintain.

It is, therefore, an object of the invention to provide a solenoid and cable arrangement to lock or unlock the locking mechanism generally found installed on conventional automobile doors.

It is furthermore an object of the present invention to provide a solenoid and motor arrangement with connecting cables for opening and closing the door of a conventional automobile by using the installed lever mechanisms thereof.

A further object of the present invention is to provide a push button actuated solenoid together with an additional off-centered pivotally mounted lever arm for maintaining the door in locked position until the remotely mounted push button actuates a solenoid to unlock the door. It is a further object of the invention to disable the locking mechanism usually found on automobile doors from being able to unlock the door if a solenoid controlling the locking mechanism has been energized.

It is a further object of the invention to control exclusively the locking operation of a door and the maintenance of the locking condition from a remote position of the door.

It is still another object of the invention to provide a remote control in the opening and closing of a vehicle door.

Perhaps the outstanding advantage of the new door actuator and locking system resides in the fact that a door may be locked and unlocked from a remote position exclusive of any control mechanism generally found on conventional doors. By this advantage, it is possible to secure a locking condition of the door and maintain the door locked, and also disable the lock button usually found on doors from being actuated to unlock the door.

One of the most important applications of the new door actuator and locking system is that it is now possible to exclude the unlocking of a conventional automobile door by lifting the lock button thereof as may be done by children in the car, or by a bandit or hitchhiker that may approach a car at a stop light and by lifting the lock button, thereby unlock the door for opening it, ostensibly against the wishes of the driver of the vehicle or automobile. Other and further objects and advantages will be apparent from a detailed description of the invention from the appended drawing and claims.

In the drawings:

Figure 1 is a schematic showing of the door actuator and locking system showing in phantom outline the cross-section of a vehicle body and the outline of a door that relate to a door actuator and locking system;

Figure 2 is a partial view in detail of the remote control lock arm and the secure lock arm generally shown in Fig. 1, in accordance with an embodiment of the present invention.

Referring now to the drawing there is illustrated in Figure 1 a portion of an automobile including a frame 10 and a door 12. The door is mounted upon hinges 14. The door may be any one or more of the two or four doors of the automobile. In the preferred embodiment of the invention a door actuator and locking system 20 is installed in the right rear door of the automobile, and a simple door locking system without the door actuator may be installed in the left rear door. As is conventional in the doors made by most manufacturers, there is constructed on the door, a door catch 24 for holding the door closed when the door is in the closed position. The door catch is released by turning a door handle (not shown) that is mounted on a handle post or stem 28. The door catch 24 is released by turning the stem 28 in a counter-clockwise direction which moves the lock release arm 30 to the left.

Also constructed on conventional doors is a mechanical push button arrangement 32 for locking the door when the push button is down. The push button mechanism arrangement includes a push button 34 which moves in conventional vertical movement, having its lower end coupled to a pivotally mounted rocker arm 36 which moves about the pivot 38. The pivot is mounted on a bracket 40 which, in turn, is securely mounted onto the door by rivets 42. The other end of the rocker arm 36 is pivotally connected to a remote control lock arm 48 extending across the width of the door. The far end of the remote control lock arm is pivotally mounted to a lever member (not shown) that engages and locks the door catch means in place when the remote control lock arm is shifted to the right. When the remote control lock arm is shifted to the left, there is no locking operation effected by the lever member since it is disengaged from the door catch means but there is a release of the locking operation. The pivotal connection 52 couples the remote control lock arm 48 to the door catch member (not shown), and instead of being firmly pivotally mounted in or on a bracket as the rocker arm 36 is mounted, the pivot 52 is slidably mounted in a longitudinal slot 53 and generally extends along a 30° or 60° incline.

Near or upon the dashboard of the automobile 10 there is mounted at least four push buttons that are connected to respective solenoid switches or solenoids 60, 61, 62, 63. If the door is in an open position, as shown in Figure 1 of the drawing, push button 55 when actuated, closes a circuit which in turn energizes a solenoid switch 60 and connects a motor 68 to a battery 70, thereby causing or effecting the rotation of a shaft 72 of the motor. Mounted on the shaft is a rubber drum or spool 74 adaptable for having wound thereon a cable. The spool may be of plastic, metal, or other materials, but a rubber material is preferred. There is shown in dotted line a helical spring 76 for normally biasing the drum in a direction clockwise with respect to the drawing so that the drum will tend to wind upon it, a cable 80 that connects the drum with the door. The far end of the cable 80 is mounted by a coupling of any conventional type for terminating a cable at the door by a strap or bracket 84. Therefore, when the motor is energized by closing of the solenoid switch 60 the motor turns the rubber spool 72 to wind the cable 80 thereon and thereby conveniently closing the door 12.

When the door is in a closed position, it may be securely locked by pushing a button 56 on the dashboard panel 54 to energize the solenoid 61. These solenoids, incidentally, are of conventional construction so that when they are energized, a core element 61a is pulled downwardly into the field of the solenoid 61. The solenoids are mounted by rivets 81 extending through the bracket 84. When the solenoid core 61a is pulled downwardly, a flexible cable or tubing 91 connected thereto is also moved downwardly. The extended end of the tubing 91 is connected to the rocker arm 36 at the base of the push button 34. The push button is moved downwardly in consequence thereto, and by further moving the remote control lock arm 48, the door catch means is locked in place so that the closed door may not be opened.

Solenoid 61 merely moves the push button 34 into the lock position. After solenoid 61 has been energized, it is simple enough to manually unlock the door by grasping the push button 34 and raising it to its extended position so that the door is again unlocked.

Also it is possible to unlock the door by a push button operation from the dashboard of the car by pushing the button 57 on the panel 54 to energize solenoid 62. Energized solenoid 62 pulls the core 62a downwardly so that a flexible cable or tubing 92 connected thereto is also pulled downwardly so that the extended end of the tubing 92 pulls or moves the remote control lock arm to the left. As described above, when the remote control lock arm is moved to the left, the door catch means 24 is unlocked, or the remote control lock arm is removed from the lock position. It is now possible to manually open the door by raising the handle (not shown) connected to the handle post or stem 28.

The flexible tubing 92 is connected to the remote control lock arm 48 by a pivot or other coupling means 92a.

Also the door may be readily opened by energizing solenoid 63 by closing the push button 58 mounted on the panel 54. Energized core 63a is drawn into the magnetic field of the solenoid 63 when energized causing the core 63a to move downwardly and drawing therewith a flexible cable or tubing 93, having its extended end firmly coupled to a point on the lock release arm by a pivot 93a. The solenoid 63 may not necessarily be mounted adjacent the other solenoids, but may as well be mounted conveniently on the door at position 93b so that a direct run of substantial linear character is provided by the flexible cable or tubing 93 from the solenoid to the lock release arm pivot 93a. The movement of the lock release arm 30 is to the right when the solenoid 63 is actuated or energized. This moves or releases the door catch means so that the door may be opened. By a slight manual push against the door, together with the effect of a helical or spirally configured spring 94, the door is urged into its fully opened position.

On the conventional doors of automobiles now commercially available, there is no provision for locking the door so securely that it may not be unlocked by playful or inquisitive children that may tinker with the various gadgets or control knobs and handles about a door, or that may be unlocked by an unsuspecting robber or hitchhiker reaching inside the door through an open window to raise the push button lock 34. A secure lock lever arm 96 is pivotally mounted on the door a slight amount off-center at and by a pivot 98. At the short end of the secure lock arm, a connection is made therefrom to the flexible tubing 92. This enables the secure lock arm 96 to rotate in a counter-clockwise direction when the solenoid 62 is energized. At the opposite end of the secure lock arm 96 there protrudes therefrom a pin 98. The pin extends from the secure lock arm in a transverse direction. The pin rides along the upper edge of the remote control lock arm, and when the remote control lock arm is in its right-hand position, i.e., when the lock button 34 is depressed, the pin 98 slips into and is firmly positioned within a V-shaped notch or slot in the remote control lock arm. The configuration of the V-shaped slot 100, together with the secure lock arm and pivotal mounting thereof, by rivets or pivot 98, securely precludes the remote control lock arm from any actuation or movement in a left-hand direction. Even upon gripping the push button 34 and firmly raising the button does not move the remote control lock arm from its firm and secure position. Therefore, it is not possible to unlock the door catch or raise the lock button 34 manually after the remote control lock arm 48 has been engaged with the pin 98 of the secure lock arm 96. The door, however, may be unlocked by energizing solenoid 62 upon depressing the push button 57 on the dash panel 55. As similarly described above, the energized solenoid 62 depresses the solenoid core 62a into the magnetic field of the solenoid 62 so that the cable 92 is urged downwardly and together rotates the secure lock arm 96 in a counter-clockwise direction therefore removing the pin from the V-shaped notch 100. The push button 34 is then moved to its raised position. The pin 98 on the secure lock arm thence rides along the upper surface of the remote control lock arm 98, until the push button 34 is again depressed, either manually or by energizing solenoid 61.

It will thus be apparent that the new apparatus is useful in securely locking a door remotely thereof and maintaining its locked condition without interference from movement of the manual push button lock member that is usually operable on doors of such vehicles.

An apparent modification also within the scope of the present invention, is to operate the solenoid circuit 58, 63, 63a for opening the door in conjunction with a current generating motion responsive device 120 connected to the drive shaft 121 to open a normally closed, current responsive relay switch 122 of relay 123, or other device indicative of the fact that the automobile is not moving. This would hence allow the door only to open by the remote control on the dashboard when the automobile is at a stand-still; also the solenoid circuit for the operation of opening the door may operate in conjunction with the brake pedal, as has been done on buses at one time.

The apparatus of the present invention is also highly advantageous in cases of remotely opening and closing the doors of an automobile so that a passenger of the automobile may ingress and egress therefrom with, for example, an armful of packages without having to use an arm additionally to open the door. Also, there is the advantage of locking or unlocking the door of such an automobile by push button operation from the driver's seat by the operator of the taxicab.

One of the more specific advantages of the apparatus resides in the feature of using such apparatus in a taxicab for opening the right rear door for the entry of passenger fares and for closing the door after the passenger fare has entered. The apparatus is further useful in opening the door for a taxicab so that a passenger may leave the automobile without working a door handle and the like that may be unfamiliar in operation to a passenger fare. In some taxicabs it has been the experience that some doors operate more readily than others, and a passenger not knowing the general characteristics or features of the door of a particular taxicab may proceed to slam the door after he has gotten out of the door in order for the door, according to his impression, to close completely.

It should be understood, however, that the specific apparatus herein illustrated and described is intended to be representative only, as many changes may be made therein without departing from the clear teachings of the invention. Accordingly, reference should be made

I claim:

1. A door actuator and locking system including a door, a door catch means, a lock release arm operable by a handle, a remote control lock arm operable by a push button mounted on the door for locking the door catch means when in a lock-position so that the lock release arm as operable by the handle does not unlock the door, the invention comprising a solenoid operable by a push-button mounted remotely of the door, a flexible cable coupling the solenoid to the remote control lock arm so that when the solenoid is actuated, the remote control lock arm is moved to a lock position, a second solenoid operable by a push-button mounted remotely of the door, a second flexible cable coupling the second solenoid to the remote control lock arm so that when the second solenoid is actuated, the remote control lock arm is removed from the lock position, a third solenoid operable by a push-button mounted remotely of the door, a third flexible cable coupling the third solenoid to the door catch means so that when the third solenoid is actuated, the door catch means is released for allowing the door to open, a spring element mounted on the door for urging the door open when the door catch means is released, a motor mounted remotely of the door operated by a push button means and having a rubber spool mounted on its shaft, a fourth flexible cable coupled at one end to said rubber spool and to the door at the other so that when the motor is energized, the cable connected thereto is wound upon the spool pulling the door closed, and a spring in bias relation to the motor and spool for maintaining the fourth flexible cable stressed.

2. A door actuator and locking system including a door, a door catch means, a lock release arm operable by a handle, a remote control lock arm operable by a push button mounted on the door for locking the door catch means when in a lock-position so that the lock release arm as operable by the handle does not unlock the door, the invention comprising three solenoids each operable by a push-button switch mounted remotely of the door and including a separate flexible cable coupled to each solenoid, the first cable being also coupled to the remote control lock arm and being moved to a lock position when the solenoid is actuated, the second cable being also coupled to the remote control lock arm and being removed from a lock position when the solenoid coupled thereto is actuated, the third cable being also coupled to door catch means for releasing the door catch means when the solenoid coupled thereto is energized, a motor mounted remotely of the door operated by a push-button means also remotely mounted of the door and having a rubber spool mounted on its shaft, and a cable coupling the door to the spool of the motor that is wound upon the spool as the motor is energized.

3. The door actuator and locking system of claim 2, further including a V-shaped recess in the remote control lock arm, an off-centered pivotally mounted arm mounted on the door and having a pin projection from the end of the larger portion of the arm for engaging said V-shaped recess and thereby maintaining the door catch means locked, a coupling at the opposite end of the pivotally mounted arm engaging the second flexible cable so that when the second solenoid is energized, the pin of the pivotally mounted arm is lifted out of the locked position and the remote control lock arm is hence allowed to shift position to release the door catch means.

4. The door actuator and locking system of claim 3, wherein a spring means is mounted between a point on the door and lock release arm.

5. A door actuator and locking system including a door, a door catch means, a lock release arm operable by a handle, a remote control lock arm operable by a push button mounted on the door for locking the door catch means when in a lock-position so that the lock release arm as operable by the handle does not unlock the door, the invention comprising a solenoid operable by a push-button mounted remotely of the door, a flexible cable coupling the solenoid to the remote control lock arm to remove the remote control lock arm from the lock position when the solenoid is energized, another solenoid operable by a push-button mounted remotely of the door, another flexible cable coupling the other solenoid to the door catch means to release the door catch means when the other solenoid is energized to allow the door to open, a spring element mounted on the door for urging the door open when the door catch means is released, a motor mounted remotely of the door operated by a push-button means and having a rubber spool mounted on its shaft, a third cable having one end coupled to the rubber spool and the other to the door, being wound upon the spool when the motor is energized to pull the door closed, and a spring in bias relation to the motor and the spool for maintaining the third cable substantially stressed.

6. A door actuator and locking system for an automobile including a door, a door catch means, a lock release arm operable by a handle, a remote control lock arm operable by a push button mounted on the door for locking the door catch means when in a lock-position so that the lock release arm as operable by the handle does not unlock the door, the invention comprising a solenoid operable by a push-button mounted remotely of the door, a flexible cable coupling the solenoid to the remote control lock arm so that when the solenoid is actuated, the remote control lock arm is moved to a lock position, a second solenoid operable by a push-button mounted remotely of the door, a second flexible cable coupling the second soleniod to the remote control lock arm so that when the second solenoid is actuated, the remote control lock arm is removed from the lock position, a third solenoid operable by a push-button mounted remotely of the door, a third flexible cable coupling the third solenoid to the door catch means so that when the third solenoid is actuated, the door catch means is released for allowing the door to open.

7. The door actuator and locking system of claim 6, further including a motor mounted remotely of the door operated by a push-button means also remotely mounted of the door and having a rubber spool mounted on its shaft, and a cable coupling the door to the spool of the motor that is wound upon the spool as the motor is energized, a V-shaped recess in the remote control lock arm, an off-centered pivotally mounted arm mounted on the door and having a pin projection from the end of the larger portion of the arm for engaging said V-shaped recess and thereby maintaining the door catch means locked, a coupling at the opposite end of the pivotally mounted arm engaging the second flexible cable so that when the second solenoid is energized, the pin of the pivotally mounted arm is lifted out of the locked position and the remote control lock arm is hence allowed to shift position to release the door catch means, and a sensing means connected in circuit relation with the third solenoid to allow the solenoid to operate when the automobile is not moving.

References Cited in the file of this patent

UNITED STATES PATENTS

| | | |
|---|---|---|
| 1,151,479 | Kurtz | Aug. 24, 1915 |
| 1,614,255 | Philbin | June 11, 1927 |
| 2,237,576 | Rakoczy | Apr. 8, 1941 |